May 26, 1970  S. P. DAME  3,513,553
GAUGING APPARATUS
Filed Sept. 29, 1967  2 Sheets-Sheet 1
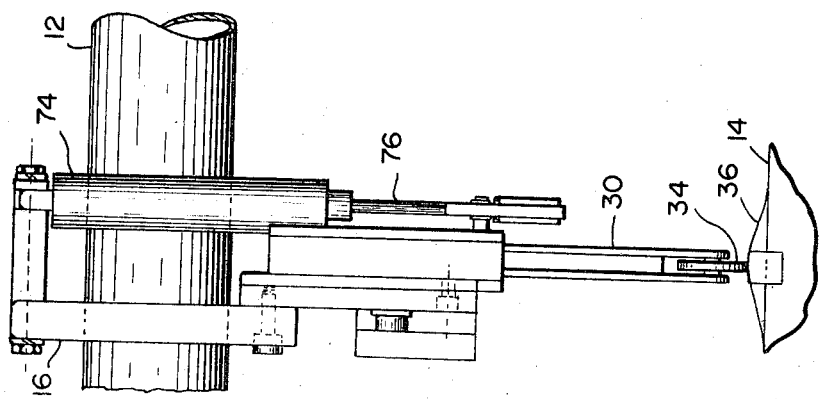
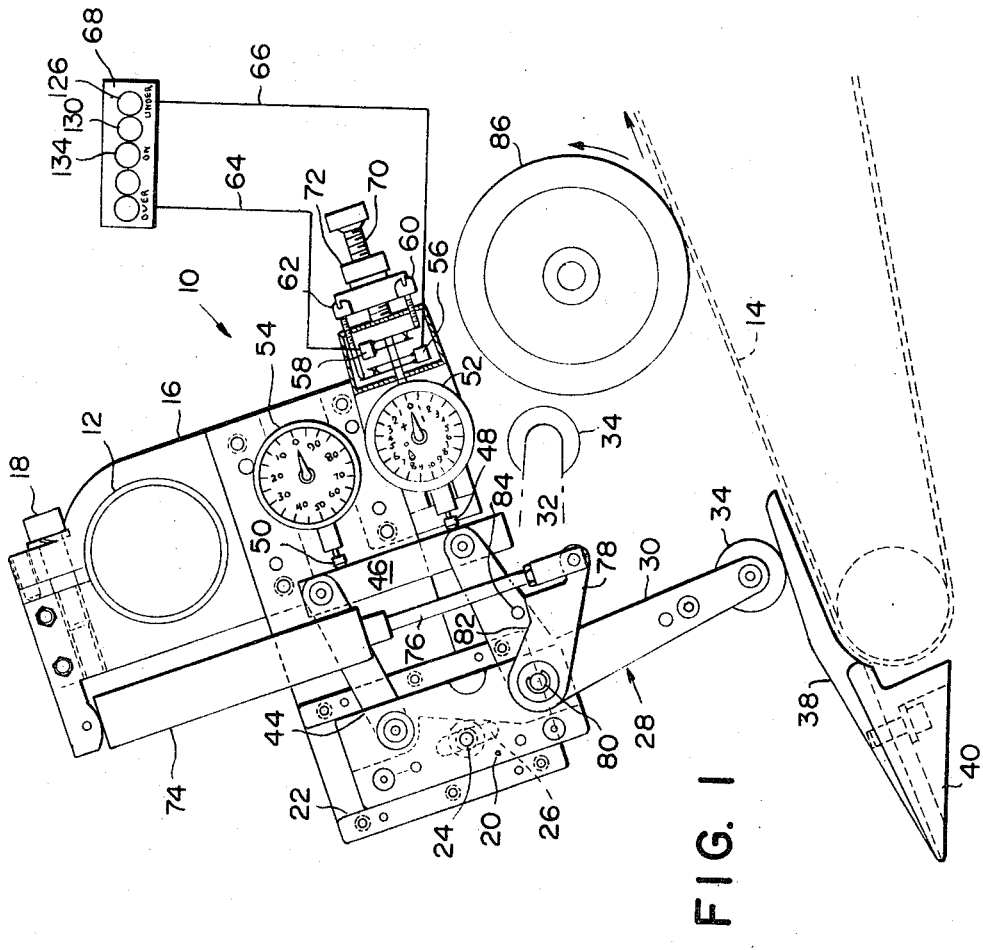
INVENTOR.
STANLEY P. DAME
BY
Morse, Altman & Oates
ATTORNEYS INVENTOR.
STANLEY P. DAME
BY Morse, Altman & Oates
ATTORNEYS

United States Patent Office 3,513,553
Patented May 26, 1970

3,513,553
GAUGING APPARATUS
Stanley P. Dame, Somersworth, N.H., assignor, by mesne assignments, to Thompson Manufacturing Company, Inc., Somersworth, N.H., a corporation of Massachusetts
Filed Sept. 29, 1967, Ser. No. 671,637
Int. Cl. G01b 5/00
U.S. Cl. 33—147       10 Claims

ABSTRACT OF THE DISCLOSURE

An apparatus is provided for automatically gauging the dimensions of an object such as the thickness of a moving leather hide, for example. The apparatus is mounted above the object and provided with a pivoted feeler arm the free end of which bears against the object to be gauged. The arm is connected to a parallel bar system which, in turn, operates a pair of dial indicators one of which is a reference gauge and the other displays the thickness variations of the object being measured. The thickness of the measured object can be represented in weight measurement by means of selecting the ratio between the length of the feeler arm and the length of an arm in the parallel bar system.

The measuring gauge can be coupled to a light indicator system for signalling to the operator when the object being gauged is over, under or within an accepted range.

BACKGROUND OF THE INVENTION (1) Field of the invention

This invention relates generally to gauging devices and more particularly is directed towards a new and improved apparatus for gauging moving objects such as leather hides and the like carried on a conveyor.

(2) Description of prior art

In gauging certain materials such as leather hides, for example, the nature of the material gives rise to a number of problems which make it difficult to obtain accurate and continuous measurements. Also leather is normally gauged or measured by weight rather than thickness and heretofore there had been no convenient means for continuously gauging and directly reading in weight measurements moving leather hides. It is, therefore, an object of this invention to provide improvements in gauging apparatus and specifically to provide a new and improved apparatus for gauging leather hides, which apparatus is adapted to measure accurately the thickness of the hide and provide a reading directly in weight measurement.

SUMMARY OF THE INVENTION

The present invention features a gauging apparatus mounted above the object to be measured such as a moving leather hide carried by a conveyor. The gauge frame carries a pivoted feeler arm the free end of which is adapted to bear against the upper surface of the object that is being measured. The feeler arm is fixed to another arm the length of which is proportional to that of the feeler arm. The second arm cooperates with a parallel link in laterally moving a bar to and away from gauging devices, one of which is a reference gauge and the other of which is the indicating gauge. The proportion between the two arms is such that the feeler arm movement produced by the thickness of the material will cause the second arm to pivot and to move the bar laterally by an amount which is in proportion to the weight of the material, this movement being measured directly as weight by the indicating gauge. A power device is provided for pivoting the feeler arm into and out of engagement with the material. The indicating gauge may be operatively connected to a light signalling system or the like to provide the operator with a visual alarm indication of the condition of the material being gauged whether it is over, under, or within an acceptable range.

BRIEF DESCRIPTION OF THE DRAWINGS

FIG. 1 is a view in side elevation partly in section of a gauging apparatus made according to the invention,
FIG. 2 is a view in front elevation thereof.

DESCRIPTION OF THE PREFERRED EMBODIMENT

Figure 3:
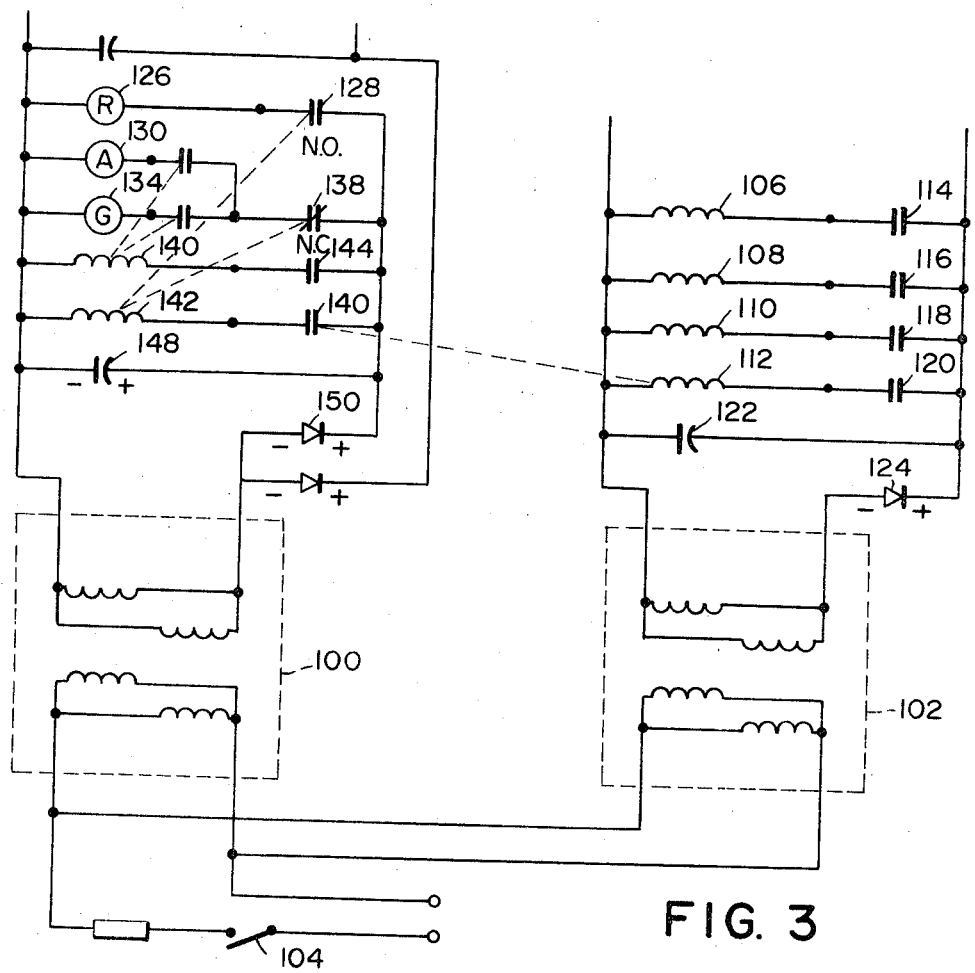
FIG. 3 is a diagram of the circuit used in the invention, and,
FIG. 4 is a schematic diagram of the air system.

Referring now to the darwings, reference character 10 generally indicates a gauging apparatus suspended by means of a fixed tubular support 12 over a conveyor system which includes a belt 14. The belt 14 may be part of a conveyor system for a leather handling apparatus of the sort disclosed in my co-pending application entitled "Method and Apparatus for Folding and Stacking Flexible Material" filed Aug. 5, 1966, Ser. No. 570,642.

The gauging apparatus generally comprises a frame 16 which is clamped to the tubular support 12 at a selected angular position by means of a bolt 18 passing through a split portion of the frame 16. The lower portion of the frame carries a block 20 mounted in a slide 22 and adapted to be adjusted and set at a predetermined position by means of a lock screw 24 passing through a slot 26. Pivoted to the lower end of the block 20 is a lever 28 having a feeler arm 30 and a shorter arm 32. The outer end of the feeler arm 30 carires a roller 34 adapted to bear against the upper surface of the material which is being gauged and which is indicated generally by reference character 36. In its lowered position, shown in full line in FIGS. 1 and 2, the roller 34 rides above a rib 38 over which the material 36 is carried up onto the conveyor. The function of the rib is to stretch the material slightly to insure that the portion which is being gauged is straight and without wrinkles when it touches the roller to guard against erroneous readings. The rib 38 is a tapered device which is fixed to a nose-piece 40 and extends over the upper reach of the conveyor belt 14.

Spaced from the arm 32 and parallel thereto is a link 44 at one end pivoted to the block 20 and at the other end pivoted to a bar 46. The outer end of the arm 32 is also pivoted to the bar 46 such that the link 44 and the arm 32 operate in parallel. The bar 46 is a straight member the right-hand surface of which, as viewed in FIG. 1, bears against the actuating rods 48 and 50 of a pair of dial indicators 52 and 54 respectively. The gauge 54 is a reference gauge for the gauge 52 as will presently appear.

In the preferred form of the invention the gauge 52 is of a type having a pair of spaced internal electrical contacts which are actuated by means of its rod 48. Devices of this type are sold under the name "Electricator" by Federal Products Corp., Providence, R.I. The device includes the actuating rod 48 which not only operates the needle hand on the dial face but also actuates a pair of switches 56 and 58 mounted within a housing at the opposite end of the gauge. In practice, the gauge is set at zero for the desired thickness and movement of the needle hand clockwise or counterclockwise will indicate whether or not the measurement is over, under, or within a predetermined range. Also, in practice, the gauge 54 is initially set so that the actuating rod 50 is at the limit of its upper movement whereby when there is no leather at all between the roller 34 and the rib 38, the indicated reading would be zero.

The indicator actuating rod 50 when once set to register zero, with roller 34 in contact with the gauging bar 38, is then locked in place. This indicator now becomes a reference gauge which always indicates whatever material thickness is under the roller 34 in terms of weight in ounces.

Actuating rod 48 is pre-set in position for any material thickness being measured so that its motion will indicate plus or minus variations in the thickness of the material being measured. This is accomplished by first placing a thickness feeler gauge under the roller 34 equal to the mean thickness of the material to be measured. By way of example, .0469" corresponds to three ounces of leather (one ounce equals 1/64" or .0156"). The reference indicator 54 should then read 30, the zero is dropped to read 3 oz. The gauge 52 is now adjusted so that its rod 48 comes into contact with the bar 46 and through the motion of the gauge body caused by adjustment of a knurled knob 70, will cause the revolution pointer to line up with the black dot and the larger pointer will stop at zero. The lock nut 72 is then tightened. The same procedure is carried out each time a different mean difference of material is to be gauged. In the event that the arm 30 is accidently pivoted or a hide of unusual thickness passes through the gauging station, the bar drops away from the rods 48 and 50 and this fail-safe action prevents damage to the instrument.

As previously indicated, the right-hand end of the rod 48 carries the limit switches 56 and 58 and these switches move as the rod 48 moves in response to changes in measurements. The two switches are actuated by means of adjustable screws 60 and 62, the ends of these screws bearing against contact arms for the switch 56 while the screw 60 is adapted to bear against a contact arm for the switch 58. The two switches are connected by leads 64 and 66 to a light indicating panel 68 whereby upon closing of the over limit switch 58 one light will go on whereas the closing of the under limit switch 56 a different light will go on and these lights may be color-coded for easy identification. Preferably the center light is green and will be illuminated as long as the limit switches are open and the leather is within the predetermined range. The other two lights may be amber or red in color and either will be illuminated depending upon which of the switches is closed. The range may be increased or decreased by merely adjusting the screws 60 and 62 as desired.

In addition to the adjustment of the individual limit switches the entire gauge assembly 52 is mounted for adjustment with respect to the bar 46 this adjustment being provided by means of the screw 70 which connects the gauge assembly to the frame 16. Once the position has been set, the screw is locked in position by means of a nut 72.

It will be noted that there is a difference in the lengths of the arms 30 and 32. The lengths of the two arms is determined by the ratio between leather thickness and weight of leather. The accepted standard is that 1 ounce of leather=1/64" thickness and this conversion of thickness to weight is achieved by the proportional movement between the arm 30 and the bar 46. In the illustrated embodiment if a leather hide 36 causes an .015" upward movement of the roller 34 it will cause the bar 46 to drop .010" away from the gauges. In this fashion standard dials may read directly in ounces rather than in the conventional thousands.

The second gauge 54 is a conventional dial indicator and is used as a reference gauge to insure that the gauge 52 is set accurately particularly with reference to its maximum and minimum readings. The bar 46 being perpendicular to both of the dial indicator rods 48 and 50 insures that setting of the reference dial with respect to the bar 46 will also set the gauge 52. The parallel bar system thus converts the swinging motion of the arm 30 to a straight up and down motion with respect to the gauges.

Between readings, the lever 28 is normally held in a raised position shown in dotted lines in FIG. 1. The lever is held in a raised position by means of a pneumatic cylinder 74 having a piston rod 76 which pivotally engages the outer end of a crank arm 78 rotatably mounted to a shaft 80 about which the lever 28 is also mounted. The crank arm is provided with a shoulder 82 which is adapted to engage a boss 84 extending out from a side of the arm 32. The piston rod 76 is normally in its extended position shown and is out of touch with the boss 84 when the arm 30 is fully down. The lever 28 is free to move about the pivot shaft 80 without interference by the crank arm 78 during normal operation. When the arm 76 is retracted the shoulder 82 engages the boss 84 and draws up the lever 28 so that the arm 30 will be in its raised position. Extension of the piston rod will allow the lever to drop by its own weight and to fall into its lowered or operating position.

The apparatus may be employed to gauge a variety of objects and is particularly useful in gauging leather hides. This is usually done at the discharge end of a splitting machine with the leather being delivered directly from the splitting machine onto the conveyor 14. This leather is normally in a rather wet condition and is relatively light in weight. To insure that the gauging apparatus functions properly, the arm 30 is formed at an angle slightly less than 90° with respect to the arm 32. In this manner the arm is more easily biased by the leather as it moves in under the roller 34 than would be the case if the arm 30 were at an exact 90°. As a further aid in the operation of the apparatus, a plurality of idler wheels 86 are spaced along the upper surface of the belt 14 and rotatably mounted to the conveyor frame. The function of the idler wheel 86 is to provide an added weight to light leather hides passing through the gauging station. It will be understood that a light piece of leather may encounter difficulty moving up the conveyor 14 and advancing through the gauging station. However, once the leather enters into the bite of the conveyor and the idler rollers the leather will be pulled firmly through the gauging station.

In practice, a plurality of gauging units may be employed at each gauging station. Normally, two such gauging units would be employed in gauging leather, one gauging unit being located at each side of the conveyor to gauge and measure opposite margins of each hide. In this fashion, hides of uniform thickness will be assured.

Referring now to FIG. 3 of the drawings, there is illustrated the circuit diagram employed in the system. The circuit includes a pair of transformers 100 and 102 both connected to a common AC power source through a switch 104 with the transformer 100 having a 24 volt output and the transformer 102 having a 6.3 volt output. Connected in parallel across the output side of the transformer 102 are relay coils 106, 108, 110, 112 and associated switch contacts 114, 116, 118 and 120. Also connected in parallel is a capacitor 122 with a rectifying diode 124 also provided. The switch contacts 114 through 120 correspond to the switch contacts for the gauge switches 56 and 58. The switches are employed to actuate relays which in turn actuate a time delay system which is connected to the output side of the transformer 100. The time delay circuit includes in parallel a red indicator light 126 and its associated switch contacts 128, an amber indicator light 130 and its switch contacts 132, a green indicating light 134 and its normally closed switch contacts 136 with normally closed switch contacts 138 connected to both the amber and green lights and their contacts. The circuit also includes a pair of coils 140 and 142 for a time delay reed relay and associated switch contacts 144 and 146. A capacitor 148 and a rectifying diode 150 are also provided.

The circuit operates as follows: Assuming the switch contacts 120 are closed by operation of the gauge rod 48, this will energize coil 112 which in turn will close the normally open switch 140 in the time delay circuit. Closing out the switch 140 will energize the reed relay 142 this in turn opening switch 138 to turn off the normally glowing green light 134 and closing switch contacts 128 to illuminate the red light 126. When the switch contacts 120 are open, coil 112 is de-energized, switch 140 opens and coil 142 is de-energized, again closing the normally closed switch 138 to illuminate the green light 134 through the normally closed contacts 136. Similarly when the contacts 118 are closed, coil 110 is energized, switch contacts 144 are closed and coil 140 is energized. This will open normally closed contacts 136 and close normally open contacts 132 to turn off the green light and turn on the amber light.

Figure 4:
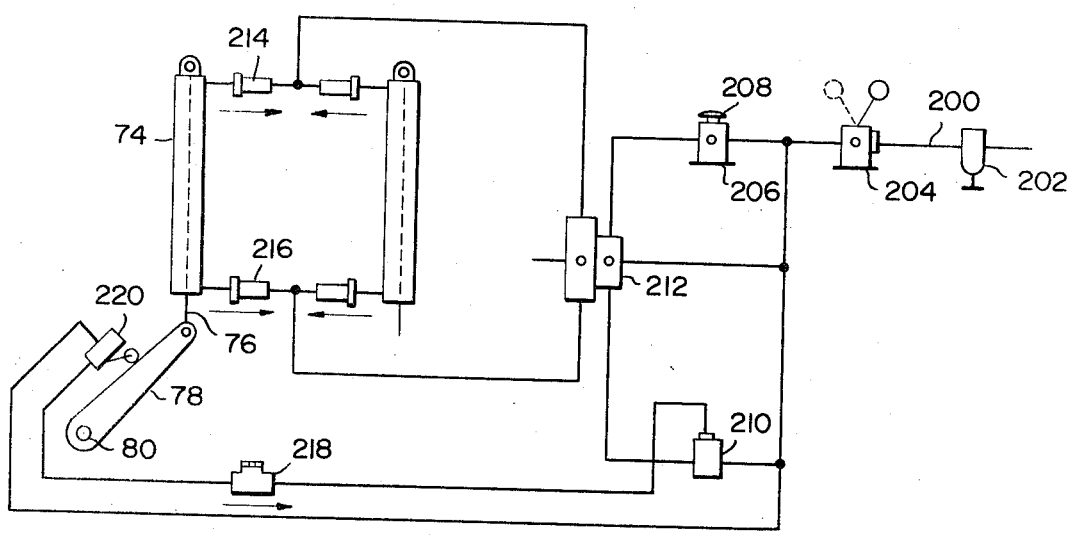

Referring now to FIG. 4 there is illustrated in digrammatic form the air system employed to actuate the pneumatic cylinder 74 which controls the position of the feeler arm 30.

In the diagram, two air cylinders are shown but the function of only one will be described insofar as their operation is identical. The air system includes a supply line 200 connected to a source of compressed air, typically on the order of 60 to 80 p.s.i. The air passes through a filter 202 and into a toggle valve 204. The discharge from the toggle valve 204 is to a valve 206 having a button 208 which the operator utilizes to cycle the system. Connected in parallel with the valve 206 is a pilot valve 210 and both of these latter two valves being connected to a double pilot valve 212. This valve is connected to opposite ends of the cylinder 74 through flow control valves 214 and 216. Also connected to the pilot valve 210 through a flow control valve 218 is a roller valve 220 actuated by means of the lever 78.

The system operates as follows: Assuming the operator wishes to cycle the system, he depresses the button 208 for the valve 206. This will pass air through the valve 206 thence through the pilot valve 212 through the top end of the cylinders 74 causing the piston rod to extend and dropping the feeler arm onto the leather. The arm will remain down for a predetermined time delay which, when it times out, will cause the valve 212 to shift, this in turn introducing air to the bottom of the cylinder 74 and relieving it on the upper end thereof.

While the invention has been described with reference to the illustrated embodiment and its use applied to gauging leather, obviously numerous modifications will appear to those skilled in the art. Likewise, a wide variety of uses will appear to those skilled in the art.

Having thus described the inventon, what I claim and desire to obtain by Letters Patent of the United States is:

1. Apparatus for gauging an object, comprising
   (a) a frame mounted over said object,
   (b) a feeler arm pivoted to said frame and having a portion adapted to bear against said object,
   (c) a pair of members pivoted to said frame in spaced parallel relation to one another,
   (d) a bar pivotally connected to both of said members to form a parallel bar system,
   (e) said arm being drivingly connected to one of said members and,
   (f) gauging means mounted to said frame in position to be actuated by said bar in response to movement of said arm.

2. Apparatus according to claim 1 including a reference gauge mounted to said frame in position to measure movement of said bar as a reference for said gauging means.

3. Apparatus according to claim 1 including power means for selectively raising said arm out of contact with said object.

4. Apparatus according to claim 1 including a plurality of indicating signal units and switching means connected thereto, said switching means being operatively connected to said gauging means and adapted to actuate one of said units according to the dimensions of said object.

5. Apparatus according to claim 1 wherein said arm is substantially perpendicular to said members.

6. Apparatus according to claim 1 wherein said arm is longer than said members by a predetermined ratio.

7. Apparatus according to claim 1 including means mounting said arm and members to said frame for independent movement to and away from said object.

8. Apparatus according to claim 1 in combination with a conveyor adapted to carry said object into gauging contact with said feeler arm.

9. Apparatus according to claim 8 including at least one idler roll mounted on the discharge side of said arm and bearing against the surface of said conveyor for pulling said object under said arm in cooperation with said conveyor.

10. Apparatus according to claim 8 including at least one stationary rib mounted above said conveyor in register with said arm and over which said object is carried while being gauged.

References Cited

UNITED STATES PATENTS 2,713,209   7/1955   Brown _____ 33—172

SAMUEL S. MATTHEWS, Primary Examiner

U.S. Cl. X.R.

33—147, 172; 74—102